United States Patent [19]

Kheidr et al.

[11] 4,348,494

[45] Sep. 7, 1982

[54] LIQUID, SOLVENT-FREE, NON-TOXIC STABILIZERS AND VINYL CHLORIDE RESIN COMPOSITIONS CONTAINING SAME

[75] Inventors: Mahmoud Kheidr; Irene A. E. Fraser, both of Toronto, Canada

[73] Assignee: Tenneco Chemicals, Inc., Piscataway, N.J.

[21] Appl. No.: 158,101

[22] Filed: Jun. 10, 1980

[30] Foreign Application Priority Data

Sep. 19, 1979 [CA] Canada .................................. 335950

[51] Int. Cl.³ .............................................. C08K 5/15
[52] U.S. Cl. .................................... 524/114; 524/109
[58] Field of Search ..... 260/23 EP, 23 XA, 45.75 W; 252/400 A

[56] References Cited

U.S. PATENT DOCUMENTS

| | | | |
|---|---|---|---|
| 3,003,998 | 10/1961 | Kauder et al. | 260/45.75 W |
| 3,003,999 | 10/1961 | Kauder et al. | 260/45.75 W |
| 3,004,000 | 10/1961 | Kauder et al. | 260/45.75 W |
| 3,231,531 | 1/1966 | Buckley et al. | 260/45.75 W |
| 3,271,338 | 9/1966 | Klemchuk et al. | 260/45.75 W |
| 3,558,539 | 1/1971 | Irish | 252/400 A |
| 3,755,200 | 8/1973 | Rhodes et al. | 252/400 A |
| 3,928,267 | 12/1975 | Rhodes et al. | 252/400 A |
| 3,943,081 | 3/1976 | Brook | 252/400 A |
| 4,178,282 | 12/1979 | Bae | 252/400 A |
| 4,220,570 | 9/1980 | Loffelholz | 260/45.85 |

*Primary Examiner*—Paul R. Michl
*Attorney, Agent, or Firm*—Evelyn Berlow

[57] ABSTRACT

Liquid, solvent-free, non-toxic stabilizers for vinyl chloride resin compositions comprise a major amount of a liquid epoxy compound and minor amounts of magnesium, zinc, and calcium salts of alkanoic acids having 6 to 26 carbon atoms, an organosulfur compound, and an organic phosphite. Vinyl chloride resin compositions that contain these stabilizers are characterized by excellent heat and light stability, color, and clarity.

9 Claims, No Drawings

LIQUID, SOLVENT-FREE, NON-TOXIC STABILIZERS AND VINYL CHLORIDE RESIN COMPOSITIONS CONTAINING SAME

This invention relates to liquid, solvent-free, non-toxic stabilizers for vinyl chloride resin compositions. It further relates to vinyl chloride resin compositions that contain these stabilizers and that are suitable for use as food packaging materials.

During processing, vinyl chloride resins and other halogen-containing resins are subjected to elevated temperatures during grinding, mixing, and shaping operations. The resins so treated tend to decompose somewhat, as is evidenced by their development of color. This decomposition is especially pronounced when scrap portions of the resins are reprocessed in apparatus operated at elevated temperatures. Even though the decomposition may not detract to any appreciable extent from the physical properties of the resins, it seriously restricts their use in many applications. There has therefore arisen a need for stabilized vinyl chloride resin compositions that can withstand without darkening or otherwise deteriorating the heating to which they may be subjecting during processing as well as the subsequent heating of the finished products.

Barium, cadmium, and lead salts and tin mercaptides are widely used as stabilizers for vinyl chloride resin compositions, but because of their toxicity they cannot be used in resinous compositions that are to be used in the manufacture of packaging materials for foodstuffs.

Non-toxic heat stabilizers for halogen-containing resins have been disclosed in a number of patents. For example, mixtures of alkaline earth metal salts and polyols are disclosed in U.S. Pat. Nos. 3,003,998, 3,003,999, and 3,004,000. Stabilizers that contain metal salts, organic phosphites, epoxy compounds, and other components are disclosed in U.S. Pat. Nos. 3,558,539, 3,755,200, 3,928,267, and 3,943,081 and Can. Pat. No. 963,649.

Most of the previously-known non-toxic stabilizers for vinyl chloride resin compositions are mixtures of solid components, mixtures of solid and liquid components, or solutions of solid and/or liquid components in organic solvents. These stabilizers are usually not completely compatible with the vinyl chloride resin and the other components of the resinous compositions. Even when their preparation is carefully carried out, resinous compositions that contain these non-toxic stabilizers are often not completely homogeneous, as is indicated by their tendency to plate out and by the cloudiness of thin sheets of the compositions. In addition, these stabilizers, which are powders or pastes, present handling and storage problems. The presence of organic solvents in the stabilizers may result in pollution problems.

In accordance with this invention, it has been found that non-toxic vinyl chloride resin compositions that are characterized by excellent heat and light stability, color, and clarity, little tendency to plate out, and other valuable properties result when certain liquid, solvent-free, non-toxic stabilizers are incorporated into the compositions.

The non-toxic stabilizers of this invention are non-viscous solvent-free liquids that are thoroughly compatible with vinyl chloride resins and the other components of resinous compositions and that can be readily blended with these materials to form stabilized compositions that are characterized by excellent color and clarity. These stabilizers are convenient to handle, and they can be pumped and metered using conventional equipment. In addition, they are stable on prolonged storage.

The liquid non-toxic stabilizers of this invention contain a major amount of a liquid epoxy compound and minor amounts of an oil-soluble polyvalent metal salt component that comprises magnesium, zinc, and calcium salts of organic acids, an organosulfur compound, and an organic phosphite. While all of the liquid epoxy compounds, polyvalent metal salts, organic sulfur compounds, and organic phosphites set forth hereinafter are useful as components of liquid solvent-free stabilizers, only those that have been granted government approval for use in food packaging materials can now be used in the liquid, solvent-free, non-toxic stabilizers of this invention.

The liquid epoxy compounds that can be used as components of the stabilizers contain one or more oxirane groups and 15 to 80 carbon atoms. A preferred group of liquid epoxy compounds consists of esters of epoxidized fatty acids having 14 to 22 carbon atoms. Illustrative of these compounds are epoxidized soybean oil, epoxidized cottonseed oil, epoxidized linseed oil, epoxidized olive oil, epoxidized coconut oil, methyl epoxystearate, butyl epoxystearate, tridecyl epoxystearate, butyl epoxymyristate, butyl epoxypalmitate, octyl epoxytallate, and mixtures thereof. Other non-toxic liquid epoxy compounds can be used alone or in combination with an ester of an epoxidized fatty acid.

The polyvalent metal salt component of the liquid non-toxic stabilizers comprises magnesium, zinc, and calcium salts of branched-chain and straight-chain alkanoic acids having 6 to 26 carbon atoms, preferably magnesium, zinc, and calcium salts of alkanoic acids having 8 to 18 carbon atoms. The acids from which the metal salts can be derived include caproic acid, caprylic acid, 2-ethylhexanoic acid, neooctanoic acid, pelargonic acid, capric acid, neodecanoic acid, lauric acid, myristic acid, palmitic acid, stearic acid, oleic acid, linoleic acid, tricosanoic acid, tetracosanoic acid, erucic acid, and brassidic acid, as well as such naturally-occurring mixtures of these acids as tallow fatty acids, coconut oil fatty acids, tall oil fatty acids, soybean oil fatty acids, cottonseed oil fatty acids, and mixtures thereof.

The organosulfur compounds that can be used as components of the liquid non-toxic stabilizers have the structural formula

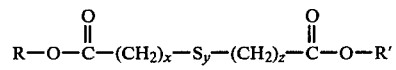

$$R-O-\overset{O}{\underset{\|}{C}}-(CH_2)_x-S_y-(CH_2)_z-\overset{O}{\underset{\|}{C}}-O-R'$$

wherein R and R' each represents hydrogen or an alkyl group having 8 to 18 carbon atoms, x and z each is 1, 2, or 3, and y is 1 or 2. Examples of these compounds include thiodiacetic acid, thiodipropionic acid, thiodibutyric acid, dithiodiacetic acid, dithiodipropionic acid, dioctyl thiodiacetate, dilauryl thiodiacetate, dioctyl dithiodiacetate, dilauryl thiodipropionate, distearyl dithiodipropionate, didecyl thiodibutyrate, and the like. The organosulfur compound is preferably thiodipropionic acid.

In addition to the epoxy compound, polyvalent metal salts, and organosulfur compound, the stabilizers contain an organic phosphite that may be a secondary or tertiary aliphatic or aromatic phosphite. Useful phosphites include diaryl phosphites, triaryl phosphites, dialkyl phosphites, trialkyl phosphites, and alkyl aryl phosphites. A preferred group of phosphites are the trialkyl, triaryl, dialkyl monoaryl, and monoalkyl diaryl phosphites in which the alkyl groups have 3 to 18 carbon atoms, preferably 6 to 12 carbon atoms, and the aryl groups are phenyl or substituted phenyl in which the substituents are alkyl groups having 4 to 12 carbon atoms. Illustrative of the preferred organic phosphites are the following: triphenyl phosphite, tri(p-tert.butylphenyl)phosphite, tri(octylphenyl)phosphite, tri(nonylphenyl)phosphite, tri(dodecylphenyl)phosphite, phenyl di(nonylphenyl)phosphite, di(p-tert.butylphenyl) (decylphenyl)phosphite, diphenyl dodecylphenyl phosphite, di(nonylphenyl)decyl phosphite, diphenyl hexyl phosphite, phenyl di(dodecyl)phosphite, diphenyl decyl phosphite, tridodecyl phosphite, p-tert.butylphenyl di(2-ethylhexyl)phosphite, trioctadecyl phosphite, and the like. Another preferred group of phosphites are the secondary phosphites that contain the aforementioned alkyl and/or aryl groups. These include, for example, diphenyl hydrogen phosphite, phenyl decylphenyl hydrogen phosphite, octaphenyl octyl hydrogen phosphite, phenyl decyl hydrogen phosphite, phenyl octadecyl hydrogen phosphite, di-2-ethylhexyl hydrogen phosphite, hexyl dodecyl hydrogen phosphite, and didodecyl hydrogen phosphite. A single phosphite or a mixture of two or more of these compounds may be used.

The liquid non-toxic stabilizers of this invention may contain from 40% to 90% by weight of at least one liquid epoxy compound, 1% to 10% by weight of a magnesium salt, 1% to 10% by weight of a zinc salt, 1% to 10% by weight of a calcium salt, 1% to 10% by weight of an organosulfur compound, and 1% to 30% by weight of an organic phosphite. Particularly good results have been obtained when the stabilizer contained 60% to 80% by weight of an epoxy compound, 3% to 7% by weight of a magnesium salt, 4% to 9% by weight of a zinc salt, 1% to 4% by weight of a calcium salt, 1% to 4% by weight of an organosulfur compound, and 9% to 15% by weight of a tertiary organic phosphite.

The liquid non-toxic stabilizers may be prepared by heating a mixture of the ingredients at a temperature in the range of 50°–200° C. until a homogeneous liquid product is obtained.

Only a small amount of one of the liquid, non-toxic stabilizers need to be incorporated into a vinyl chloride resin composition to impart heat stability to it. As little as 1% of one of these stabilizers, based on the weight of vinyl chloride resin, will bring about an appreciable improvement in the heat stability of the composition. Five percent or more of the stabilizers can be used, but these larger amounts generally do not provide further improvements in the properties of the resinous compositions and so are not ordinarily used. In most cases, from 2% to 4%, based on the weight of vinyl chloride resin, of the liquid, non-toxic stabilizers gives the most advantageous results.

The liquid stabilizers of this invention can be used in flexible, semi-rigid, and rigid vinyl chloride resin formulations to impart heat and light stability and other valuable properties to the resinous compositions.

The vinyl chloride resins that may be present in the stabilized resinous compositions include both polyvinyl chloride and copolymers formed by the polymerization of vinyl chloride with up to about 30% by weight of a copolymerizable monomer, such as vinyl acetate, vinyl butyrate, vinylidene chloride, styrene, ethylene, propylene, ethyl acrylate, methyl methacrylate, and the like.

In addition to the vinyl chloride resin and liquid, non-toxic stabilizer, the stabilized resinous compositions may contain such conventional resin additives as plasticizers, e.g., di-2-ethylhexyl phthalate and tricresyl phosphate, pigments, dyes, processing aids, and impact modifiers, extenders, and lubricants in the amounts ordinarily employed in non-toxic resinous compositions for the purposes indicated.

The stabilized vinyl chloride resin compositions may be prepared by any suitable and convenient procedures, for example, by mixing the ingredients on a two or three roll mill, by blending in a mixer such as a Henschel blender, or by tumbling.

The invention is further illustrated by the following examples. In these examples, all parts are parts by weight.

EXAMPLE 1

A series of liquid stabilizers was prepared by blending varying amounts of epoxidized soybean oil, magnesium stearate, zinc stearate, calcium stearate, thiodipropionic acid, and tri(nonylphenyl)phosphite at room temperature and heating the resulting blends at 100°–200° C. for 1 to 2 hours. The resulting stabilizers were clear, non-viscous liquids which were stable when stored at room temperature for one month or more. The amounts of the ingredients used in preparing the stabilizers are set forth in Table I.

TABLE I

| Stabilizer | Components Used in Preparation of the Stabilizers (Parts) | | | | |
|---|---|---|---|---|---|
| | 1A | 1B | 1C | 1D | 1E |
| Epoxidized Soybean Oil | 71.0 | 69.0 | 78.3 | 60.0 | 67.0 |
| Magnesium Stearate | 5.0 | 4.0 | 3.9 | 3.0 | 7.0 |
| Zinc Stearate | 7.0 | 8.0 | 5.8 | 9.0 | 4.0 |
| Calcium Stearate | 3.0 | 4.0 | 1.2 | 3.0 | 4.0 |
| Thiodipropionic Acid | 4.0 | 3.0 | 1.2 | 4.0 | 3.0 |
| Tri(nonylphenyl)phosphite | 10.0 | 12.0 | 9.6 | 21.0 | 15.0 |

EXAMPLE 2

Flexible polyvinyl chloride compositions were prepared using the following procedure:

To 100 parts of polyvinyl chloride were added 35 parts of di-2-ethylhexyl phthalate, 5 parts of epoxidized soybean oil, and 3 parts of one of the stabilizers whose preparation is described in Example 1 or a comparative non-toxic stabilizer. The resulting mixture was blended at room temperature and then charged to a two-roll, steam-heated, differential speed mill whose surface temperature was maintained at 170° C. The mixture was milled for 5 minutes and then removed from the rolls as a sheet 0.045 inch in thickness.

The heat stability ratings of the compositions were determined by placing 1"×1" specimens that had been cut from the milled sheets in a forced-circulation air oven at 200° C. and removing them periodically until degradation was complete as indicated by color change. The heat stability ratings of the compositions are given in Table II. In this table and in Table III, a numerical scale is used to indicate heat stability ratings of the samples, with a rating of 1 denoting no discoloration; 2, slight discoloration; 3, moderate discoloration; 4, severe discoloration; and 5, very severe discoloration.

Two comparative stabilizers were used. Stabilizer CX-392 is a non-toxic paste stabilizer that contains calcium stearate, zinc stearate, epoxidized soybean oil, and sorbitol; Stabilizer CX-691 is a non-toxic paste stabilizer that contains calcium stearate, zinc stearate, epoxidized soybean oil, and thiodipropionic acid.

TABLE II

| Stabilizer | | Heat Stability Ratings After Indicated Number of Minutes at 200° C. | | | | | | |
|---|---|---|---|---|---|---|---|---|
| | | 0 | 5 | 10 | 15 | 20 | 25 | 30 |
| Ex. No. | | | | | | | | |
| 2A | Product of Ex. 1A | 1 | 1 | 1 | 3 | 3 | 3 | 4 |
| 2B | Product of Ex. 1B | 1 | 1 | 1 | 3 | 3 | 3 | 4 |
| 2C | Product of Ex. 1C | 1 | 1 | 1 | 3 | 3 | 3 | 4 |
| 2D | Product of Ex. 1D | 1 | 1 | 1 | 3 | 3 | 3 | 4 |
| 2E | Product of Ex. 1E | 1 | 1 | 1 | 3 | 3 | 3 | 4 |
| Comp. Ex. | | | | | | | | |
| A | CX-392 | 1 | 1 | 1 | 3 | 4 | 5 | 5 |
| B | CX-691 | 1 | 1 | 2 | 3 | 3 | 3 | 4 |

EXAMPLE 3

A series of semi-rigid polyvinyl chloride compositions was prepared by the procedure described in Example 2 from 100 parts of polyvinyl chloride, 20 parts of di-2-ethylhexyl phthalate, 5 parts of epoxidized soybean oil, and 3 parts of one of the stabilizers whose preparation is described in Example 1 or a comparative stabilizer. The heat stability ratings of the polyvinyl chloride compositions are given in Table III.

The comparative stabilizer used was Stabilizer V-1546/1385, which is a powder stabilizer that contains 32% of calcium stearate, 32% of zinc stearate, 16% of sorbitol, 10% of thiodipropionic acid, and 10% of tri(nonylphenyl)phosphate.

TABLE III

| Stabilizer | | Heat Stability Ratings After Indicated Number of Minutes at 200° C. | | | | | | |
|---|---|---|---|---|---|---|---|---|
| | | 0 | 5 | 10 | 15 | 20 | 25 | 30 |
| Ex. No. | | | | | | | | |
| 3A | Product of Ex. 1A | 1 | 1 | 2 | 3 | 3 | 3 | 4 |
| 3B | Product of Ex. 1B | 1 | 1 | 2 | 3 | 3 | 3 | 4 |
| 3C | Product of Ex. 1C | 1 | 1 | 2 | 3 | 3 | 3 | 4 |
| 3D | Product of Ex. 1D | 1 | 1 | 2 | 3 | 3 | 3 | 4 |
| 3E | Product of Ex. 1E | 1 | 1 | 2 | 3 | 3 | 3 | 4 |
| Comp. Ex. | | | | | | | | |
| C | V-1546/1385 | 1 | 2 | 3 | 3 | 3 | 3 | 4 |

From the data in Tables II and III it will be seen that the liquid non-toxic stabilizers of this invention were more effective in both flexible and semi-rigid polyvinyl chloride resin compositions than the comparative commercially-used paste and powder non-toxic stabilizers.

What is claimed is:

1. A liquid, solvent-free, non-toxic stabilizer for vinyl chloride resin compositions that comprises
   (a) 40% to 90% by weight of a liquid epoxy compound that is an ester of epoxidized fatty acids having 14 to 22 carbon atoms;
   (b) 1% to 10% by weight of a magnesium salt of an alkanoic acid having 6 to 26 carbon atoms;
   (c) 1% to 10% by weight of a zinc salt of an alkanoic acid having 6 to 26 carbon atoms;
   (d) 1% to 10% by weight of a calcium salt of an alkanoic acid having 6 to 26 carbon atoms;
   (e) 1% to 10% by weight of thiodipropionic acid; and
   (f) 1% to 30% by weight of an organic phosphite selected from the group consisting of secondary and tertiary alkyl, aryl, and alkyl aryl phosphites in which the alkyl groups have 3 to 18 carbon atoms and the aryl groups are phenyl or alkylphenyl in which each alkyl group has 4 to 12 carbon atoms.

2. A liquid, solvent-free, non-toxic stabilizer as defined in claim 1 wherein the organic phosphite is tri(nonylphenyl)phosphite.

3. A liquid, solvent-free, non-toxic stabilizer as defined in claim 1 wherein the epoxy compound is epoxidized soybean oil.

4. A liquid, solvent-free, non-toxic stabilizer as defined in claim 1 wherein the magnesium, zinc, and calcium salts are salts of alkanoic acids having 8 to 18 carbon atoms.

5. A liquid, solvent-free, non-toxic stabilizer as defined in claim 1 that contains magnesium stearate, zinc stearate, and calcium stearate.

6. A liquid, solvent-free, non-toxic stabilizer as defined in claim 1 that contains
   (a) 60% to 80% by weight of said epoxy compound,
   (b) 3% to 7% by weight of said magnesium salt,
   (c) 4% to 9% by weight of said zinc salt,
   (d) 1% to 4% by weight of said calcium salt,
   (e) 1% to 4% by weight of thiodipropionic acid, and
   (f) 9% to 15% by weight of said organic phosphite.

7. A liquid, solvent-free, non-toxic stabilizer as defined in claim 1 that contains
   (a) 60% to 80% by weight of epoxidized soybean oil,
   (b) 3% to 7% by weight of magnesium stearate,
   (c) 4% to 9% by weight of zinc stearate,
   (d) 1% to 4% by weight of calcium stearate,
   (e) 1% to 4% by weight of thiodipropionic acid, and
   (f) 9% to 15% by weight of tri(nonylphenyl)phosphite.

8. A non-toxic, heat and light stable resinous composition that comprises a vinyl chloride resin and 1% to 5%, based on the weight of the vinyl chloride resin, of a liquid, solvent-free stabilizer that comprises
   (a) 40% to 90% by weight of a liquid epoxy compound that is an ester of epoxidized fatty acids having 14 to 22 carbon atoms;
   (b) 1% to 10% by weight of a magnesium salt of an alkanoic acid having 6 to 26 carbon atoms;
   (c) 1% to 10% by weight of a zinc salt of an alkanoic acid having 6 to 26 carbon atoms;
   (d) 1% to 10% by weight of a calcium salt of an alkanoic acid having 6 to 26 carbon atoms;
   (e) 1% to 10% by weight of thiodipropionic acid; and
   (f) 1% to 30% by weight of an organic phosphite selected from the group consisting of secondary and tertiary alkyl, aryl, and alkyl aryl phosphites in which the alkyl groups have 3 to 18 carbon atoms and the aryl groups are phenyl or alkylphenyl in which each alkyl group has 4 to 12 carbon atoms.

9. A non-toxic, heat and light stable resinous composition that comprises polyvinyl chloride and 2% to 4%, based on the weight of polyvinyl chloride, of a liquid, solvent-free stabilizer that contains
   (a) 60% to 80% by weight of epoxidized soybean oil,
   (b) 3% to 7% by weight of magnesium stearate,
   (c) 4% to 9% by weight of zinc stearate,
   (d) 1% to 4% by weight of calcium stearate,
   (e) 1% to 4% by weight of thiodipropionic acid, and
   (f) 9% to 15% by weight of tri(nonylphenyl)phosphite.

* * * * *